G. N. KASEMATIS AND B. A. STAMATELOPOULOS.
AEROPLANE.
APPLICATION FILED SEPT. 7, 1918.
1,349,460.
Patented Aug. 10, 1920.
7 SHEETS—SHEET 1.
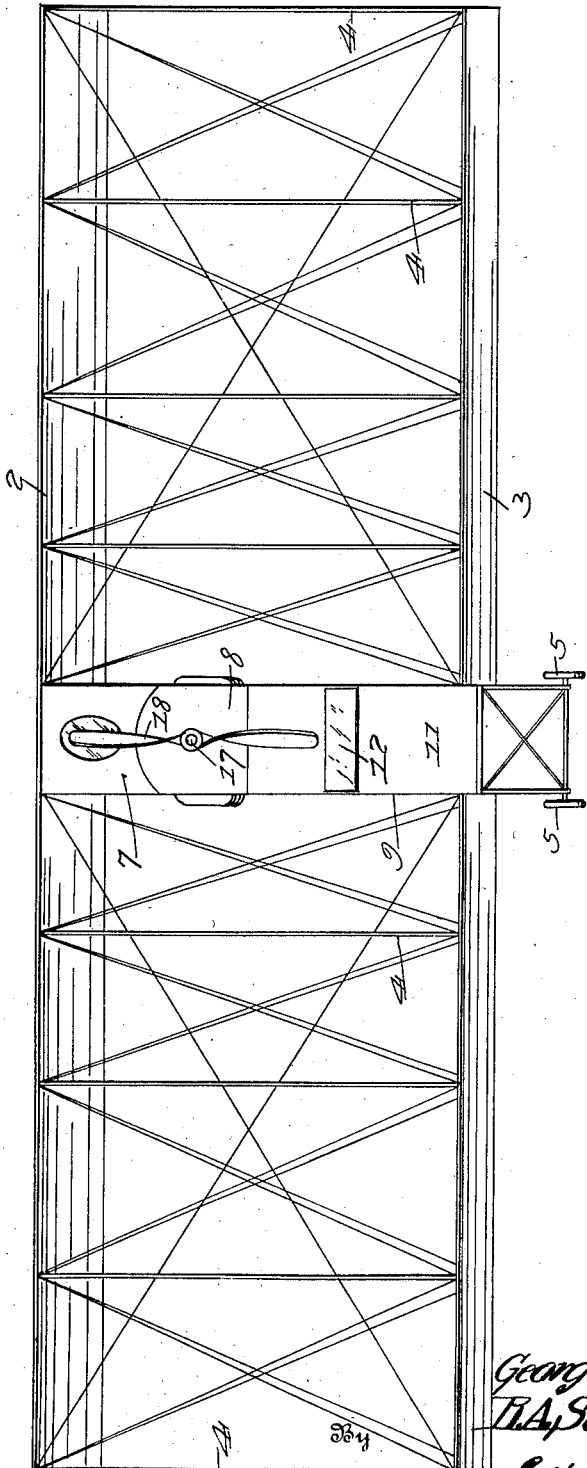
Inventors
George N. Kasematis and
B. A. Stamatelopoulos,
By R. Hume Talbert, Attorney G. N. KASEMATIS AND B. A. STAMATELOPOULOS.
AEROPLANE.
APPLICATION FILED SEPT. 7, 1918.
1,349,460.
Patented Aug. 10, 1920.
7 SHEETS—SHEET 2.
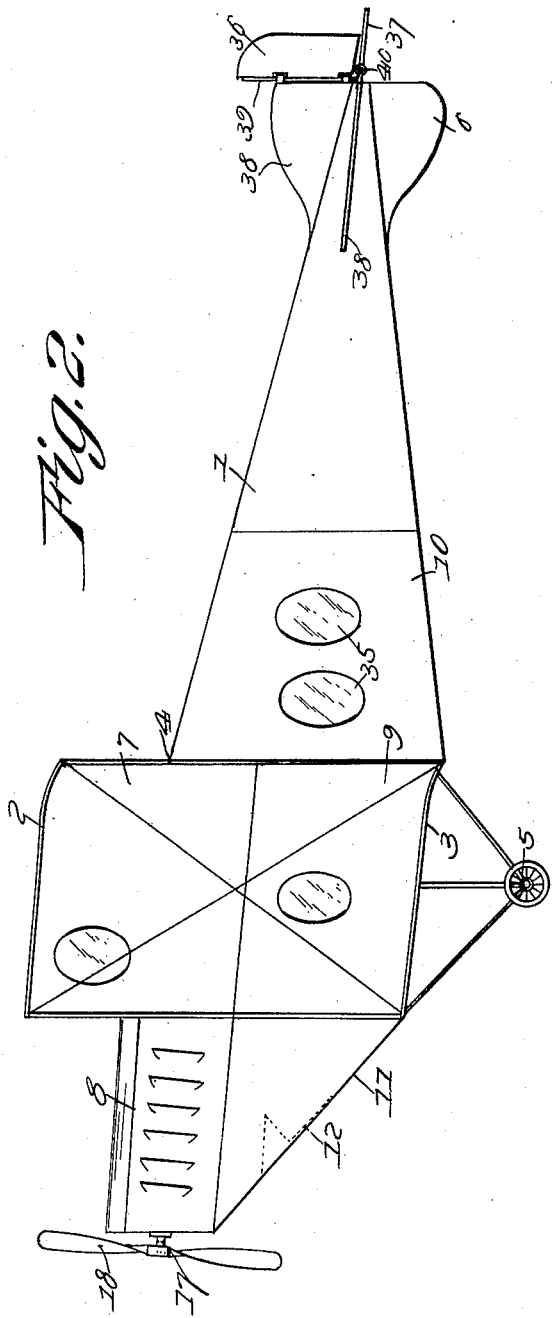

G. N. KASEMATIS AND B. A. STAMATELOPOULOS.
AEROPLANE.
APPLICATION FILED SEPT. 7, 1918.
1,349,460.
Patented Aug. 10, 1920.
7 SHEETS—SHEET 3.
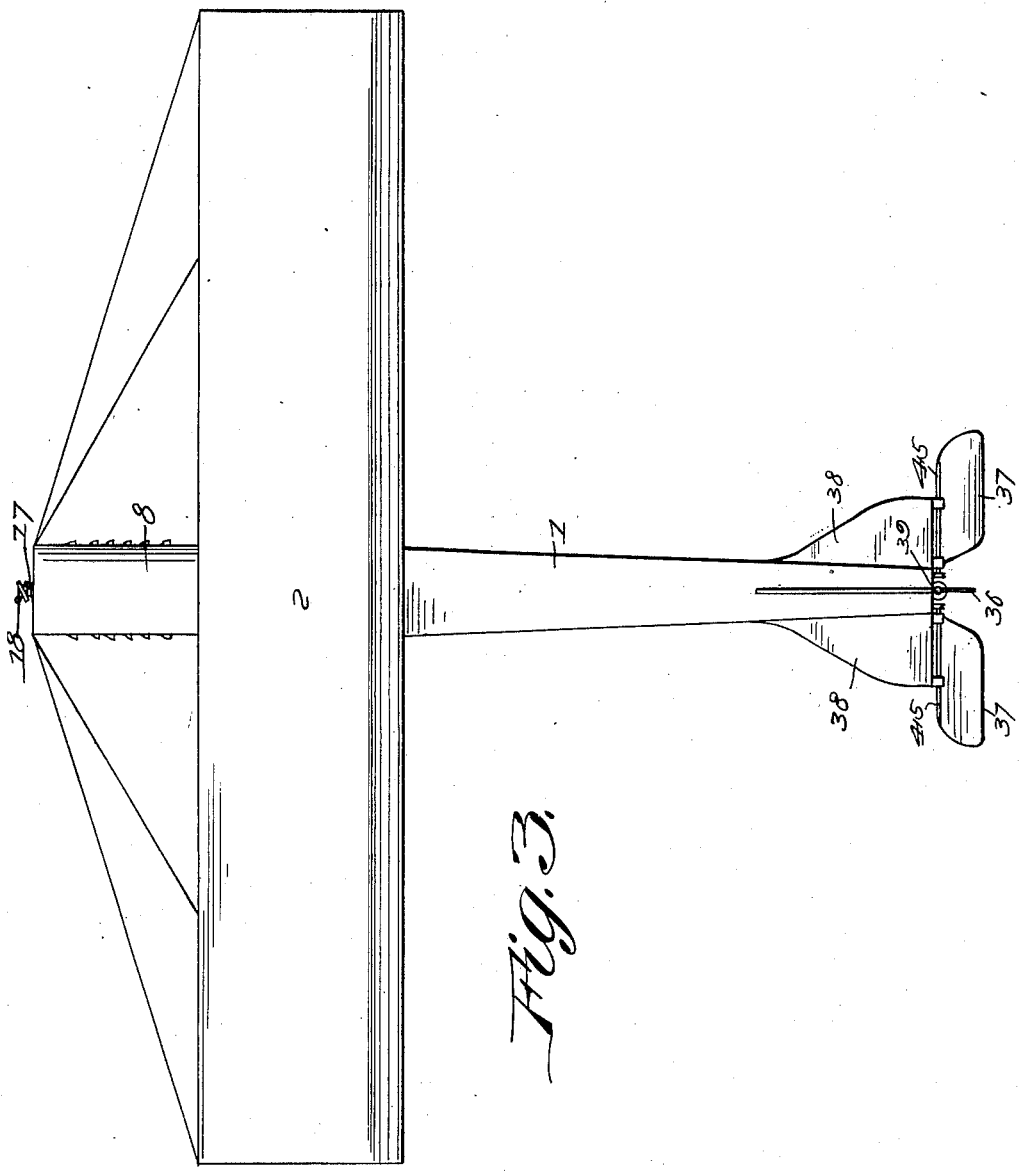

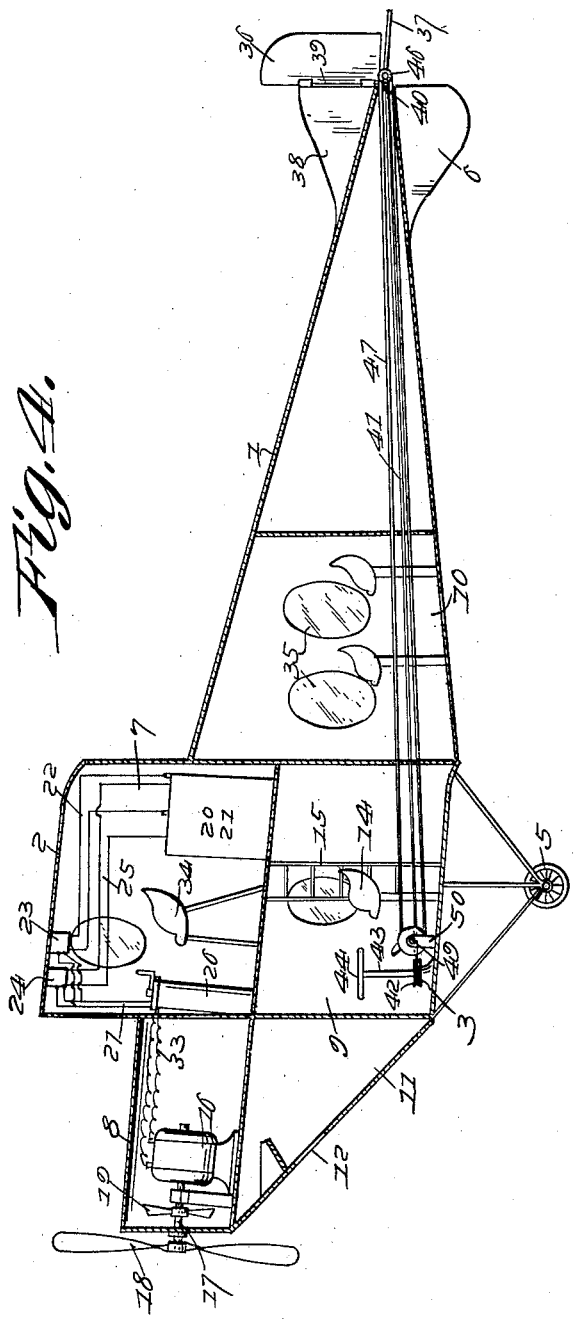

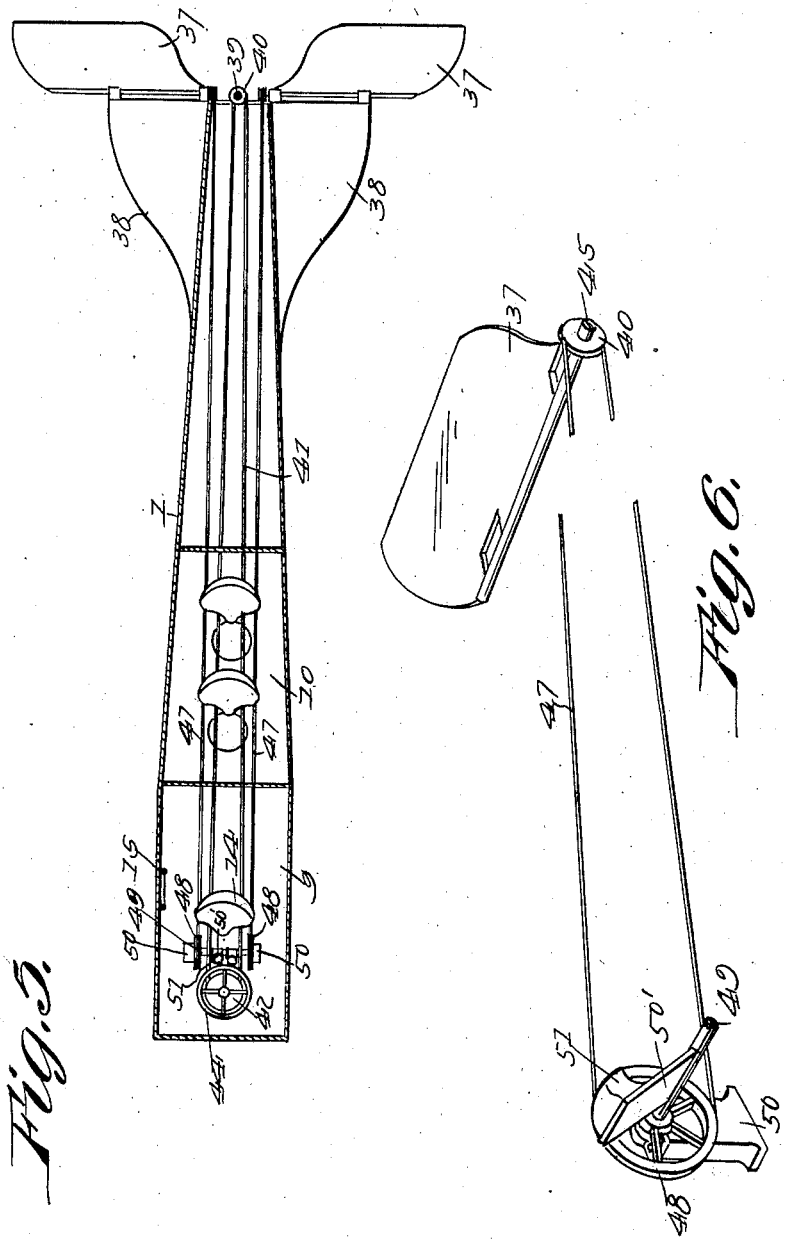

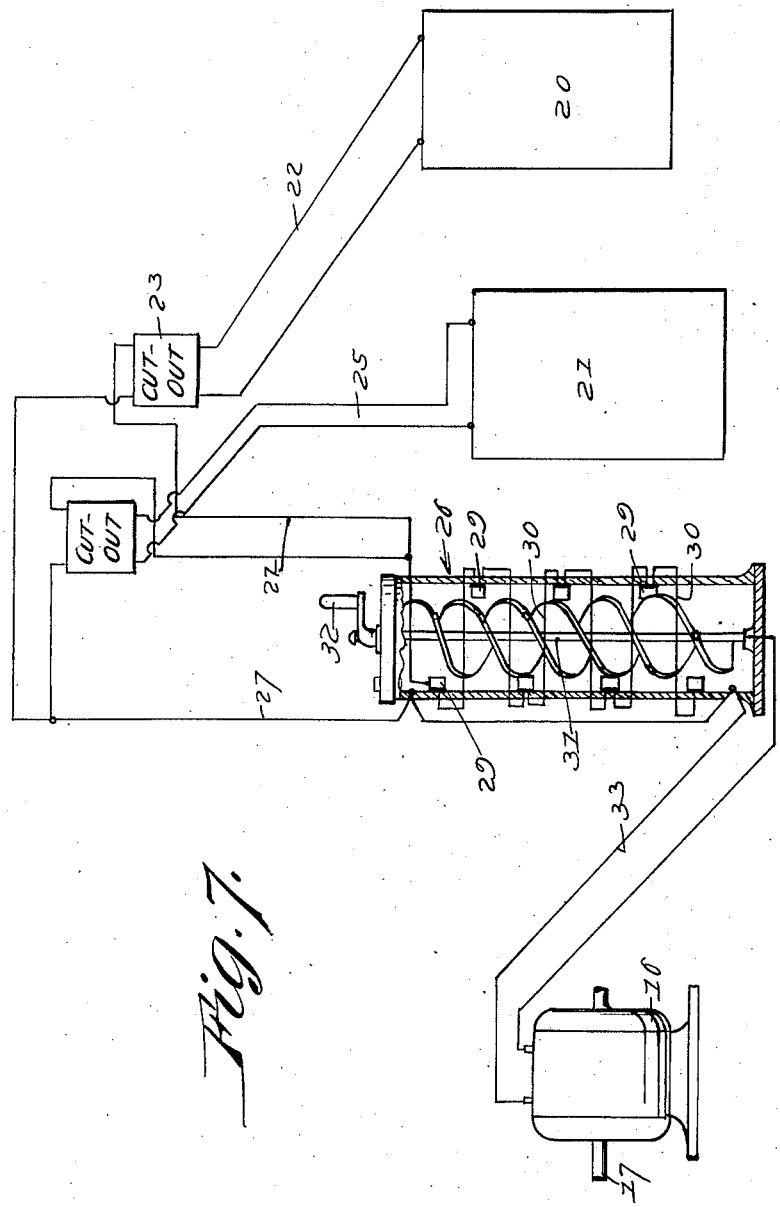

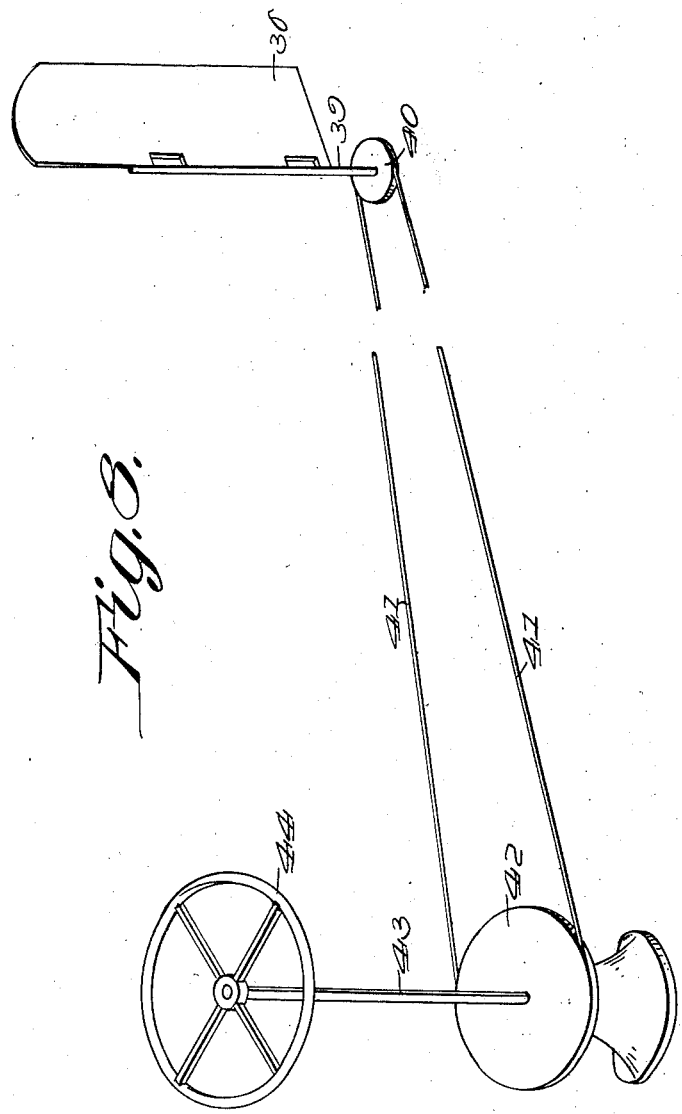

UNITED STATES PATENT OFFICE.

GEORGE N. KASEMATIS AND BARTHOLOMUS A. STAMATELOPOULOS, OF NEW YORK, N. Y.

AEROPLANE.

1,349,460.

Specification of Letters Patent. Patented Aug. 10, 1920.

Application filed September 7, 1918. Serial No. 253,097.

*To all whom it may concern:*

Be it known that we, GEORGE N. KASEMATIS and BARTHOLOMUS A. STAMATELOPOULOS, subjects of the King of Greece, residing at New York, in the county of New York and State of New York, have invented new and useful Improvements in Aeroplanes, of which the following is a specification.

The purpose of the invention is to provide an aeroplane construction the propeller power for which is derived from an electrical source, suitable control apparatus being interposed between the source of power supply and the driving motor, so that variable speed may be obtained at the propeller. Aside from this feature the invention further provides for a unique and efficient steering mechanism by which the machine may be turned either to the right or left or directed upwardly and downwardly, the up or down steering being such that the optimum of the angle of incidence is obtained. That the operator may be permitted to readily see below him—that is, to see the ground lying directly below him—the fuselage is so shaped that adequate provision is made for the placing of a magnifying lens therein through which the operator or aviator may conveniently look.

Other and further purposes of the invention appear hereinafter as the invention is described in detail.

For the purpose of illustration a specific embodiment of the invention is adhered to in the drawings and in the specification, but to this embodiment the invention is not to be restricted. Actual use in practice may suggest certain desirable changes or alterations and the right is claimed to make any which do not deviate from the scope of the annexed claim.

The same numerals of reference designate the same parts throughout the several figures of the drawings, wherein:

Figure 1 is a front elevational view of the invention.

Fig. 2 is a side elevational view.

Fig. 3 is a top plan view.

Fig. 4 is a central longitudinal vertical sectional view.

Fig. 5 is a longitudinal horizontal sectional view.

Fig. 6 is a perspective detail illustrating one of the elevating and lowering rudders and the control for the same.

Fig. 7 is a diagrammatic view illustrating the driving mechanism control.

Fig. 8 is a perspective detail illustrating the steering rudder and its control.

The invention comprises the main elements of an aeroplane construction including the fuselage generally designated 1, the upper and lower planes 2 and 3 positioned in the usual way with reference to the fuselage and suitably inter-connected by guy wires 4, and fore and aft landing elements 5 and 6.

The fuselage is built to provide a motor operator's compartment 7 and the motor compartment 8. These are positioned at the top of the fuselage and below the former a pilot's compartment 9 is provided and to the rear of this latter compartment there is provided a compartment 10 in which observers, bomb throwers or other persons having useful duties to perform may be carried. To the forward of the compartment 9 and below the motor compartment 8, the fuselage is formed with a diagonally disposed bottom 11 which includes, between its line of juncture with the forward end of the fuselage and its line of juncture with that part of the fuselage forming the bottom of the compartments 9 and 10, a glass section 12 which is preferably a magnifying lens. This magnifying lens 12 is positioned for the convenient use of the pilot who, in the operation of the machine, will occupy the seat 14 carried in the compartment 9 for this purpose.

The compartment 7 being above the compartment 9, access is had to the former from the latter by means of a ladder 15.

As a means for driving the machine there is provided a motor 16 carried in the compartment 8. This motor is suitably bolted in position and is provided with a shaft 17 extending forwardly and protruding from the front end of the fuselage in the wall of which front end it is suitably journaled. Exterior to the fuselage, the shaft 17 receives the propeller bolt 18 and between the forward end wall of the fuselage and the movable element of the motor it carries a fan 19 for the obvious purpose of serving as a cooling medium for the motor when the latter is in operation.

In the compartment 7 there are carried the batteries 20 and 21, the terminals of the former being connected by wires 22 to the cut-out 23 and the terminals of the latter being connected with the cut-out 24 by means of the wires 25. The cut-outs 23 and 24 connect with the controller 26 by means of wires 27. The controller comprises the cylindrical housing 28 on the interior of which there are carried the insulated contacting members 29 between succeeding units of which there are attached resistance elements 30. Mounted for angular movement in the housing 28 there is an element 31 operable by means of a handle 32 positioned exterior to and at the upper end of the housing 28. This angularly movable element 31 is designed for coöperative action with the contacting members 29 and to that end the wires 27 leading from the cut-outs 23 and 24 are brought to effect electrical contact with it. The motor 16 is electrically connected with the controller 26 and for this purpose leads or wires 33 are brought from the motor and connect one each to the terminal unit of each of the two sets of contacting members 29.

The controller 26 is positioned in the compartment 7 with the batteries 20 and 21 and there is also provided in this compartment a seat 34 on which the operator controlling the motor may sit in order to be conveniently positioned for the operation of the controller handle 32.

The batteries are designed to operate the motor 16 independently and the one is used for the purpose after the other is run down. It is for this purpose that the cut-outs 23 and 24 are provided, it being not the intention to use both batteries at the same time, although such use would be possible even though the batteries be connected serially or in parallel. Of course if the batteries are serially connected and but one is used, the motor runs at reduced voltage and therefore at reduced speed. On the other hand, if the batteries are connected in multiple the draft of power on the two would be no greater than it would be on the one, but the two would serve to keep the motor in motion a greater length of time than would the one.

The compartment 10 of the fuselage being for the use of observers or persons assigned to other tasks than running the machine, it is provided with windows 35.

The compartment 9 constitutes an apartment for the pilot of the improved machine and the pilot's duties are to operate the steering rudder 36 and the elevating and lowering rudders 37. The fuselage at the rear end carries the stabilizing surfaces 38, to the vertically disposed one of which the steering rudder 36 is hingedly or pivotally attached and to the horizontal ones of which the elevating or lowering rudders 37 are similarly attached. It will be observed that there are two elevating rudders 37 as against one steering rudder 36 and the former are positioned one on either side of the latter.

That the steering rudder 36 may be operated, it is provided with a spindle 39 depending from its lower end and positioned concentrically with reference to the hinge or pivotal connection of the steering rudder. This spindle 39 carries a sheave 40 over which there is trained a round belt 41, the latter extending forwardly into the compartment 9 where it traverses a second sleeve 42 which is carried on an angularly movable upright shaft 43 appropriately mounted in the compartment 9, angular movement being imparted to the shaft 43 through the instrumentality of a hand-wheel 44 carried at its upper end. The hand wheel 44 constitutes the immediate operating means for the steering rudder and thus it and its shaft 43 are positioned just to the forward of the pilot's seat 14. It will be observed that the angularly movable elements constituting the steering apparatus are mounted for movement on vertical axes. In this respect they differ from the operative elements of the elevating and lowering rudders. These rudders shifting on horizontal axes are formed each on its inner end with a spindle 45 concentric with its hinge or pivotal connection. Each spindle 45 carries a sheave 46 over which there is trained a round belt 47, the two of these belts traversing sheaves 48 which are carried at opposite ends of a horizontally disposed rock shaft 49 mounted in bearing supports 50. This rock shaft and its attending bearing supports are positioned to the forward of the pilot's seat 14 and between it and the shaft 43. The shaft 49 being designed for operation by the feet of the pilot, carries foot operative elements 50 which comprise substantial foot rests with which there are associated the guards 51 designed to embrace the tops of the feet, so that the movement of the feet may positively rock the shaft 49 in either direction, obviously for the purpose of shifting the elevating rudders downwardly or upwardly for the purpose of ascent or descent.

It is believed that the accompanying drawings and the foregoing description make apparent the operation and advantages of the invention and a further or more extended description is, therefore, omitted.

The invention having been described, what is claimed as new and useful is:

In an aeroplane, a fuselage having stabilizing surfaces at its rear end disposed one in a vertical plane and two in a horizontal plane, a rudder hingedly attached to the vertical stabilizing surface, means adjacent the forward end of the fuselage for operating the said rudder, rudders hingedly attached to the horizontally disposed stabilizing surfaces and disposed one on either side of the first said rudder, the two last said rudders being provided with inwardly directed staffs alined with their hinged or pivotal connections, sheaves carried on the inner ends of the staffs, a rock shaft positioned adjacent the operating means of the first said rudder, sheaves carried on opposite ends of said rock shaft, bearing supports for said rock shaft, belts trained over the sheaves on the rock shaft and the sheaves on the staffs, and foot rests mounted on the rock shaft and provided with guards to embrace the feet whereby the rests may be moved in either direction in a plane at right angles to the axis of the rock shaft to effect rocking movement of the latter in either direction for the purpose specified.

In testimony whereof we affix our signatures.

GEORGE N. KASEMATIS.
BARTHOLOMUS A. STAMATELOPOULOS.